United States Patent
Nakamura

(10) Patent No.: US 10,421,242 B2
(45) Date of Patent: Sep. 24, 2019

(54) DEVICE FOR BONDING RUBBER STRIP

(71) Applicant: SUMITOMO RUBBER INDUSTRIES LTD., Kobe-shi, Hyogo (JP)

(72) Inventor: Yoshinobu Nakamura, Kobe (JP)

(73) Assignee: SUMITOMO RUBBER INDUSTRIES LTD., Kobe-shi, Hyogo (JP)

( * ) Notice: Subject to any disclaimer, the term of this patent is extended or adjusted under 35 U.S.C. 154(b) by 359 days.

(21) Appl. No.: 14/650,174

(22) PCT Filed: Dec. 2, 2013

(86) PCT No.: PCT/JP2013/082367
§ 371 (c)(1),
(2) Date: Jun. 5, 2015

(87) PCT Pub. No.: WO2014/103621
PCT Pub. Date: Jul. 3, 2014

(65) Prior Publication Data
US 2015/0298412 A1    Oct. 22, 2015

(30) Foreign Application Priority Data

Dec. 27, 2012    (JP) ................................ 2012-285675

(51) Int. Cl.
*B29D 30/60*    (2006.01)
*B29D 30/30*    (2006.01)
*B29D 30/16*    (2006.01)

(52) U.S. Cl.
CPC ............. *B29D 30/60* (2013.01); *B29D 30/16* (2013.01); *B29D 30/1621* (2013.01);
(Continued)

(58) Field of Classification Search
CPC ............ B29D 30/1621; B29D 30/1628; B29D 30/1635; B29D 30/3021; B29D 30/3028;
(Continued)

(56) References Cited

U.S. PATENT DOCUMENTS 3,924,729 A * 12/1975 Flinth .................. G01G 11/003
177/16
4,330,116 A * 5/1982 Newsome .............. B65H 29/14
271/178
(Continued)

FOREIGN PATENT DOCUMENTS

DE    102005046115 A1 *  3/2007 ......... B29D 30/1621
GB        2265135      *  9/1993 ............. B65G 67/60
(Continued)

OTHER PUBLICATIONS

Machine generated English language translation of JP 60-228308 (original document dated Nov. 1985).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A rubber strip is bonded with high accuracy to the surface of a non-linear cylinder-like wound body. The space occupied by the device is reduced. Provided is a transporting conveyor having a transporting belt guided rotatably by guiding rollers. A transporting surface of the transporting belt is provided with a transporting surface width centerline extending in a straight line over the entire length thereof. The guiding rollers are distributed into forward-side guiding rollers and backward-side guiding rollers in the transporting direction. Since the forward-side guiding roller is held tiltibly around the transporting surface width centerline, the
(Continued)

transporting surface forms a twistable twisting transporting surface portion between a forward-side transporting surface portion supported by the forward-side guiding roller and a forward-side transporting surface portion supported by the backward-side guiding roller.

6 Claims, 9 Drawing Sheets

(52) U.S. Cl.
CPC ......... *B29D 30/1628* (2013.01); *B29D 30/30* (2013.01); *B29D 30/3021* (2013.01); *B29D 30/3028* (2013.01)

(58) Field of Classification Search
CPC ............... B29D 30/3035; B29D 30/60; B29D 2030/0033; B29D 2030/1678; B29D 2030/1692; B29D 2030/3078; B29D 2030/3092; B29D 2030/4412; B29D 30/08; B29D 30/24; B29D 30/28; B29D 30/30; B29D 30/3007; B65H 2301/33212; B65G 15/14; B65G 15/16; B65G 47/244; B29C 53/562
USPC .............................................. 156/394.1, 397
See application file for complete search history.

(56) References Cited

U.S. PATENT DOCUMENTS

| | | | | |
|---|---|---|---|---|
| 4,889,333 A | * | 12/1989 | Gammerler | B65H 5/023 198/839 |
| 5,032,701 A | * | 7/1991 | Umetsu | B23H 7/10 219/69.12 |
| 5,335,415 A | * | 8/1994 | Okufuji | B29D 30/1628 156/117 |
| 5,395,475 A | | 3/1995 | Ozawa et al. | |
| 2006/0081325 A1 | | 4/2006 | Hayashi et al. | |
| 2007/0107848 A1 | | 5/2007 | Hayashi et al. | |
| 2008/0041514 A1 | | 2/2008 | Uchida et al. | |
| 2011/0005660 A1 | * | 1/2011 | Ogawa | B29D 30/1628 156/117 |
| 2011/0232830 A1 | * | 9/2011 | Rey | B29D 30/16 156/111 |

FOREIGN PATENT DOCUMENTS

| | | | | |
|---|---|---|---|---|
| JP | 60-228308 | * | 11/1985 | ............. B65G 15/10 |
| JP | 01-294111 | * | 11/1989 | ............. B65G 15/14 |
| JP | 2006-110856 A | | 4/2006 | |
| JP | 2007-136740 A | | 6/2007 | |
| JP | 2011-194737 A | | 10/2011 | |
| WO | WO 2006/043395 A1 | | 4/2006 | |

OTHER PUBLICATIONS

Machine generated English language translation of JP 01-294111 (original document dated Nov. 1989).*
Noboru Ishihara, JP 2011-194737, machine translation. (Year: 2011).*
Kastens Sven, DE-102005046115, machine translation. (Year: 2007).*
International Search Report issued in PCT/JP2013/082367 dated Jan. 21, 2014.
Extended European Search Report dated Aug. 24, 2016, in European Patent Application No. 13868811.4.

* cited by examiner

DEVICE FOR BONDING RUBBER STRIP

TECHNICAL FIELD

The present invention relates to a device for bonding rubber strip to bond a rubber strip with high accuracy around a non-linear cylinder-like wound body.

BACKGROUND

As a method for forming rubber members of a pneumatic-tire, well-known is a strip winding method by use of an unvulcanized rubber strip. In this method, the rubber strip is continuously wound in the ti re circumferential direction on a surface of a wound body such as foam for forming a tire; thereby forming annular rubber members (tread rubber, sidewall rubber and the like, for example). In the strip winding method, different kinds of cross-sectional shapes of the rubber members can be obtained by varying a winding pitch and the winding number of the rubber strip.

And the following Patent Document 1 discloses, as shown in FIG. 9, a device for bonding a rubber strip (a) for the strip winding method. The bonding device (a) bonds a rubber strip T with high accuracy on a surface of a non-linear cylinder-like wound body (b) such as a drum-like body for example and comprises a transporting conveyor (c) for transporting the rubber strip.

In particular, the bonding device (a) comprises:

(1) a lateral moving means (gx) to laterally move the transporting conveyor (c) in an X-axis direction, which is parallel to a shaft center (bi) of the wound body (b), (2) an up-and-down move means (gy) to move forward and backward the transporting conveyor (c) toward the wound body (b) in a Y-axis direction, and (3) a gyrating means (gz) to gyrate the transporting conveyor (c) around a shaft center (Zi) in a perpendicular z-axis direction.

Thus, even when the wound body (b) has a non-linear cylinder-like profile, a foremost-side guiding roller (e) in the transporting direction of the transporting conveyor (c) can be freely inclined in concert with the profile. Therefore, it is possible to accurately apply the rubber strip (T) without incurring a large deformation such as a wrinkle and non-uniform growth.

However, in the above-mentioned structure itself, the entire of the elongated transporting conveyor (c) gyrating around the shaft center (Zi) in the perpendicular Z-axis direction. Therefore, the gyration needs a large space, and it makes difficult to set parallel with another bonding device. Moreover, in the area inside the gyration, there is a possibility of collision with the transporting conveyor (c); therefore, it requires a large limitation of a working space of a worker, and it leads to a drawback in working efficiency.

CONVENTIONAL ART DOCUMENTS

Patent Documents

Patent Document 1: JP 2006-110856

SUMMARY OF THE INVENTION

Problems to be Solved by the Invention

Therefore, the present invention aims to provide a device for bonding rubber strip capable of bonding a device for bonding rubber strip with high accuracy on a surface of a non-linear cylinder-like wound body while reducing space occupied by the device, making parallel setting possible with another bonding device, and expanding the working space of the worker.

Means for Solving the Problems

The present invention relates to a device for bonding a rubber strip comprising a applicator to transport unvulcanized rubber strip to a non-linear cylinder-like wound body rotationally actuated and to bond the rubber strip around a the wound body, wherein the applicator comprises a transporting conveyor having a transporting belt which is rotatably guided by a plurality of guiding rollers and transports the rubber strip on a transporting surface;

the transporting surface comprises a transporting surface width centerline extending in a straight line over the entire length of the transporting surface; and the guiding rollers are distributed into forward-side guiding rollers including a foremost-side guiding roller disposed on the foremost side in the transporting direction and backward-side guiding rollers including a backmost-side guiding roller disposed on a backmost side in the transporting direction, and the forward-side guiding rollers are held tiltibly around the transporting surface width centerline, so that the transporting surface forms a twistable twisting transporting surface portion between a forward-side transporting surface portion supported by the forward-side guiding rollers and a backward-side transporting surface portion supported by the backward-side guiding rollers.

In the bonding device according to the present invention, it is preferable that the backward-side guiding rollers be supported by a first frame, and the forward-side guiding rollers be supported by a second frame held tiltably by the first frame around the transporting surface width centerline.

In the bonding device according to the present invention, it is preferable that the applicator comprises a pressing conveyor having a pressing belt which is rotatably guided by a plurality of upper guiding rollers and presses the rubber strip to the transporting belt. It is also preferable that the pressing belt comprises a pressing surface comprising a frontward-side pressing surface portion to press the rubber strip against the forward-side transporting surface portion, a backward-side pressing surface portion to press the rubber strip against the backward-side transporting surface portion, and a twisting pressing surface portion to press the rubber strip against the twisting transporting surface portion.

Effect of Invention

The bonding device according to the present invention comprises a transporting conveyor having a transporting belt to transport a rubber strip as mentioned above, and a transporting surface of the transporting belt has a transporting surface width centerline extending in a straight line over the entire length thereof.

And, when guiding rollers supporting rotatably the transporting belt are distributed into the forward-side guiding rollers in the transporting direction and the backward-side guiding rollers in the transporting direction, the forward-side guiding rollers are held tiltably around the transporting surface width centerline. Thus, the transporting surface can form the twistable transporting surface portion between the forward-side transporting surface portion supported by the forward-side guiding rollers and the backward-side transporting surface portion supported by the backward-side guiding rollers.

Such a transporting conveyor can freely incline the foremost-side guiding roller in the transporting direction in concert with the profile of the wound body by the tilt around the transporting surface width centerline, thereby accurately applying the rubber strip without incurring a large deformation such as a wrinkle and non-uniform growth. Moreover, the transporting surface has a transporting surface width centerline extending in a straight line over the entire length thereof, in conformity with the tilt of the foremost-side guiding roller in the transporting direction, it can accurately and stably transport without changing the length of the rubber strip.

The transporting conveyor does not gyrate around the perpendicular shaft center but tilts around the transporting surface width centerline. Thus, it makes a large space for gyrating unnecessary and can diminish in space occupied by the device. This makes parallel setting possible with another bonding device. This s makes it possible to expand the working space of the worker while assuring security for the worker, thereby improving working efficiency of bonding.

EMBODIMENT OF THE INVENTION

Hereinafter, an embodiment of the present invention will be described in detail.

Figure 1:
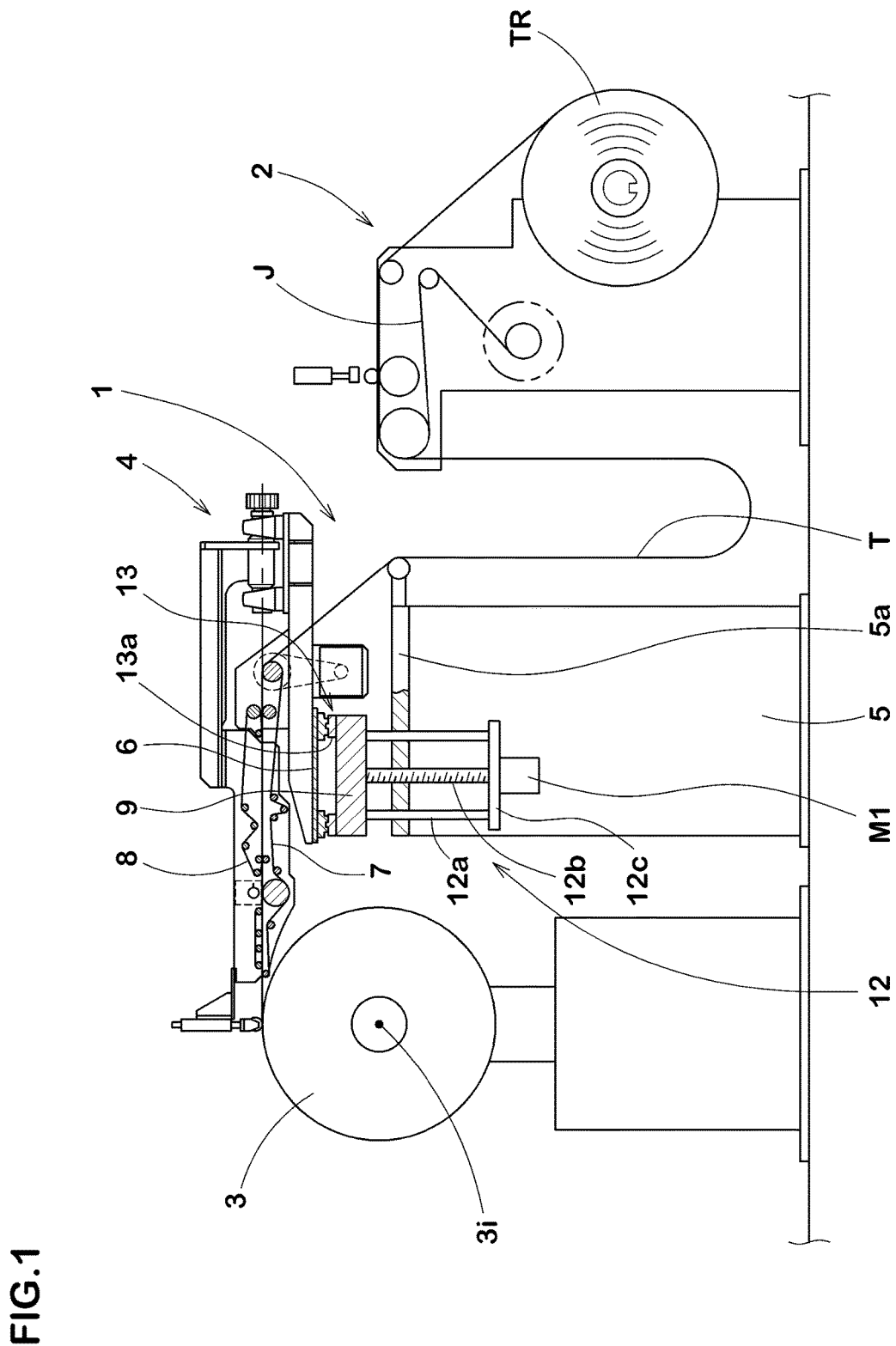
FIG. 1 is a side view showing an embodiment of a device for bonding a rubber strip according to the present invention.
Figure 2:
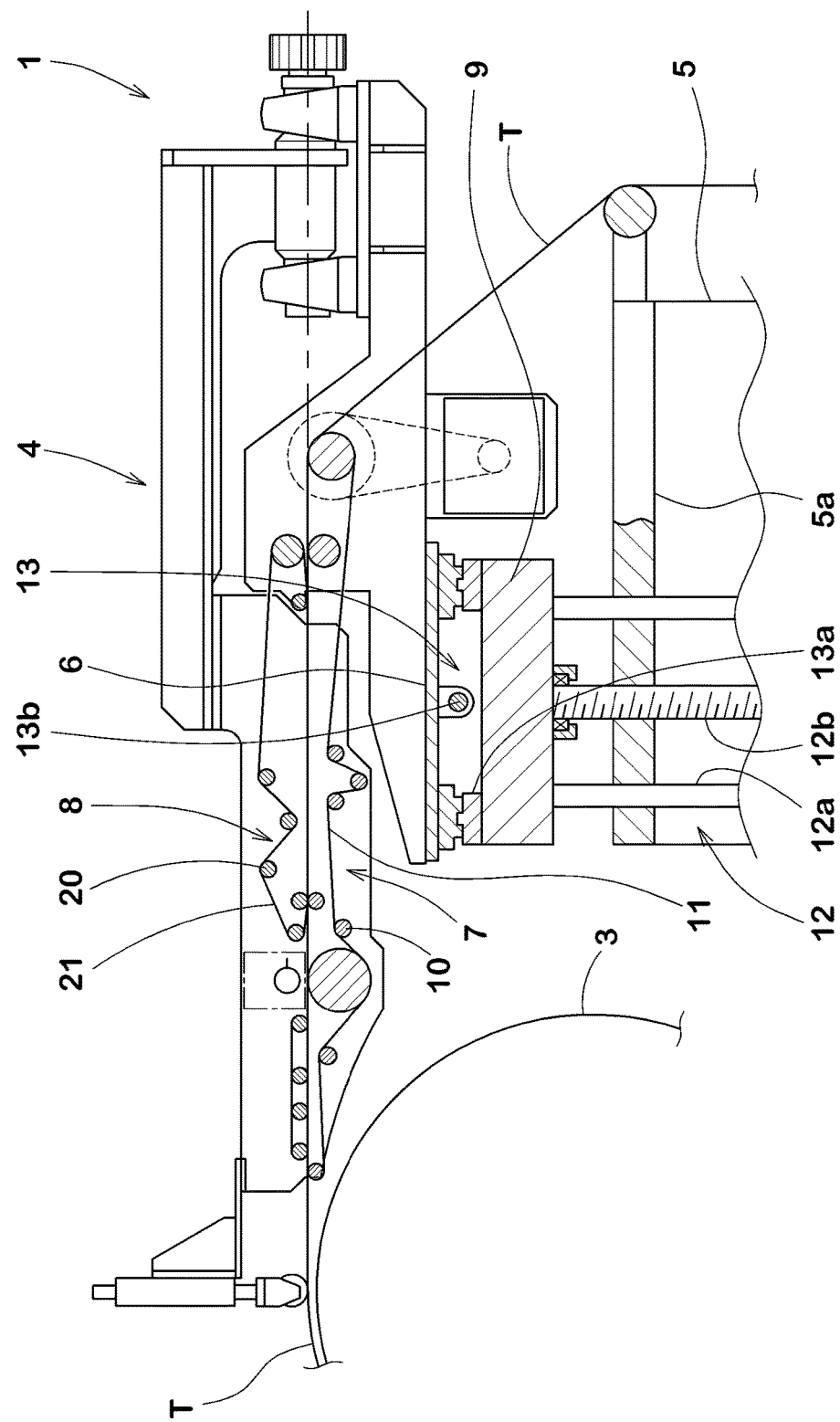
FIG. 2 is an enlarged side view of an applicator.

As shown in FIGS. 1 and 2, a device for bonding a rubber strip 1 of the present embodiment (hereinafter, may be simply called "bonding device 1") comprises an applicator 4 for transporting an unvulcanized rubber strip T, which is supplied from a rubber strip supplier 2, to a wound body 3 rotationally actuated and for applying the rubber strip T around the wound body 3.

In the present embodiment, the wound body 3 is foam for forming a tire. By winding the rubber strip T around it, rubber members such as a tread rubber, for example, are formed. The wound body 3 comprises a non-linear cylinder-like profile such as a drum-like profile, for example, in concert with a shape of the tire. For the rubber strip T, a cord can also be buried inside, in this instance, a band layer of the tire is formed.

The rubber strip supplier 2 supplies the rubber strip T to the bonding device 1. In the present embodiment, the rubber strip supplier 2 is a so-called roll stand, which supplies from a wound-up (roll) TR of the rubber strip T previously wound in whorl, winds off the rubber strip T to supply the bonding device 1. The sign in drawings shows a peeling tape, which is disposed alternately with the rubber strip T so as to prevent from adherence between the rubber strips T on the wound-up TR. The peeling tape 3 is recovered at the time of winding off of the rubber strip T.

The rubber strip supplier 2 may be a rubber extrusion device for forming the rubber strip T by extrusion. In this instance, for the extrusion device, a gear pump extrusion device provided on a forward end side with a calender roll may be preferably employed.

The bonding device 1 according to the present embodiment comprises a basal table 5, a lift table 9 supported movably up and down by the basal table 5, and a lateral moving table 6 supported movably in the lateral direction by the lift table 9. To the lateral moving table 6, the applicator 4 is attached. The lift table 9 is supported movably up and down via a lift means 12. The lift means 12 of the present embodiment comprises a pair of perpendicular guiding shafts 12a and a perpendicular ball screw shaft 12b. In the guiding shaft 12a, an upper end is fixed to the lift table 9, and a lower end is fixed to a lower panel 12c. The ball screw shaft 12b is rotatably supported by the lift table 9 and the lower panel 12c, and the lower end portion is connected with a lift motor M1 attached to the lower panel 12c. The basal table 5 comprises a support panel portion 5a comprising a guide hole for insertion of the guiding shaft 12a and a screw hole screwed together with the ball screw shaft 12b.

The lateral moving table 6 according to the present embodiment is movably supported in a x-axis direction parallel to a shaft center 3i of the wound body 3 via a lateral moving means 13. As shown in FIG. 2, the lateral moving means 13 of the present embodiment comprises a ball screw shaft 13b and a guide rail 13a in the x-axis direction disposed in the lift table 9, and an end of the ball screw shaft 13b is connected with a lateral move motor (not shown) attached to the lift table 9. The lateral moving table 6 comprises a guide portion guided by the guide rail 13a and a nut portion screwed together with the ball screw shaft 13b. Therefore, the applicator 4 can freely change portions in the up-and-down direction (z-axis direction) and the lateral direction (x-axis direction) by the actuations of the lift motor M1 and the lateral move motor.

The applicator 4 comprises at least a transporting conveyor 7 mounted on the lateral moving table 6 integrally movably. The present embodiment shows a case that the applicator 4 comprises the transporting conveyor 7 and a pressing conveyor 8 disposed thereabove.

Figure 3:
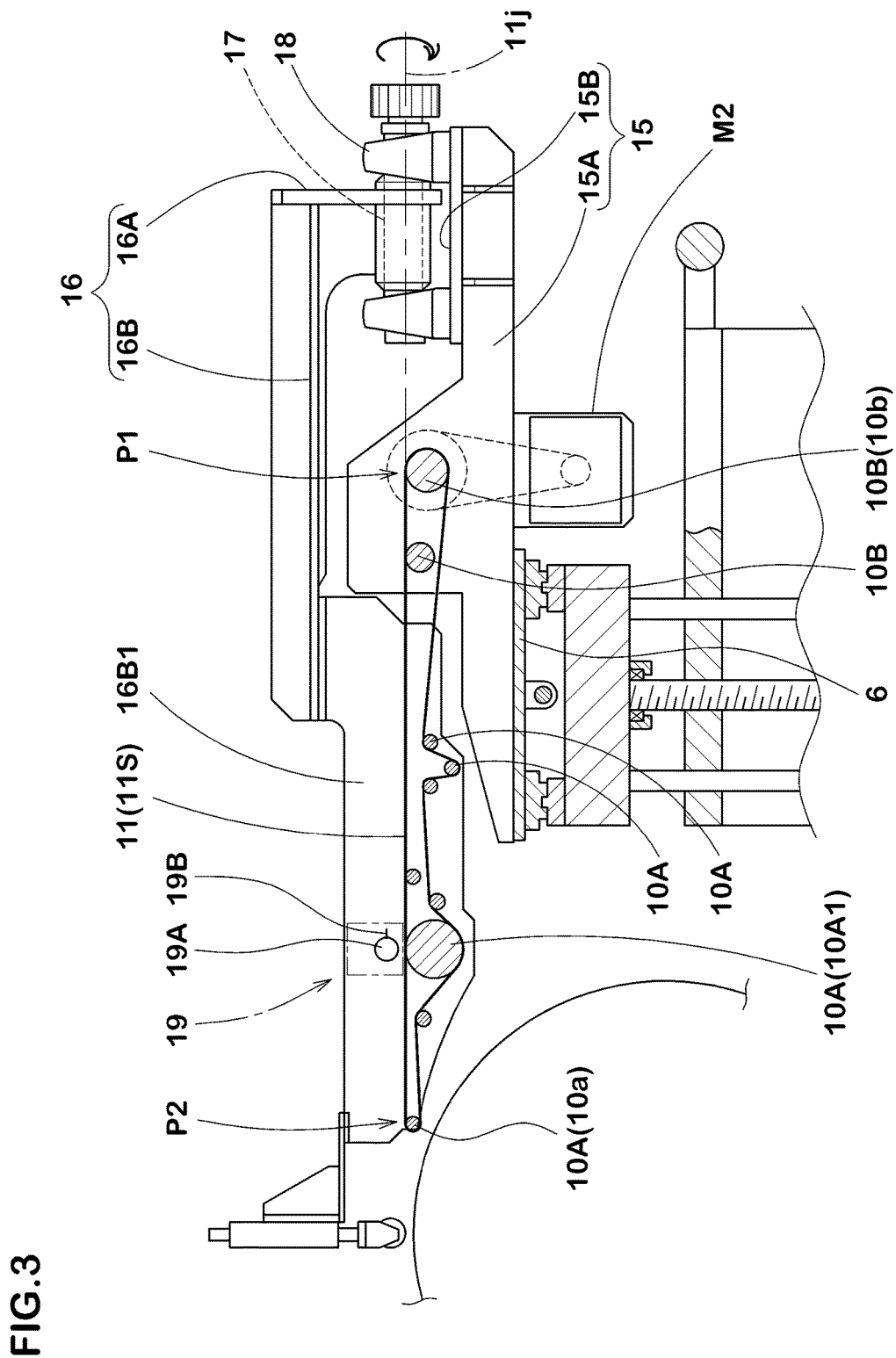
FIG. 3 is a side view of a transporting conveyor.
Figure 4:
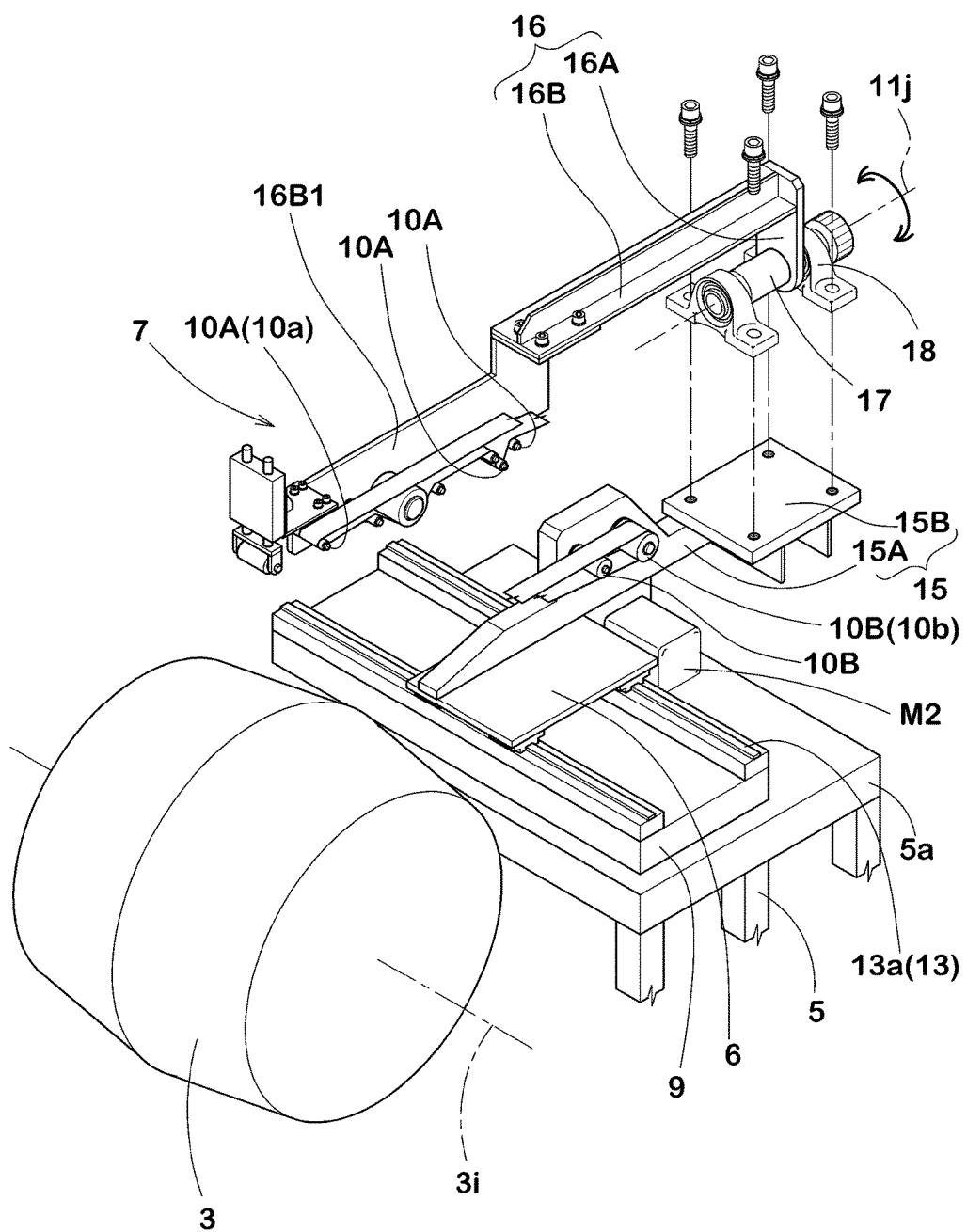
FIG. 4 is an exploded perspective view of the transporting conveyor.

The transporting conveyor 7 comprises a plurality of guiding rollers 10 and a transporting belt 11 guided rotatably by the guiding rollers 10. AS shown in FIGS. 3 and 4, the transporting belt 11 is provided in a top surface with a transporting surface 11S, and the rubber strip T is transported on the transporting surface 11S from a receiving position P1 from the rubber strip supplier 2 to a discharging position P2 to the wound body 3. As conceptually shown in FIG. 5, a width center line of the transporting surface 11S extends in a straight line over the entire length of the transporting surface 11S. That is to say, the transporting surface 11S comprises the transporting surface width centerline 11j extending in a straight line over the entire length thereof.

Figure 5:
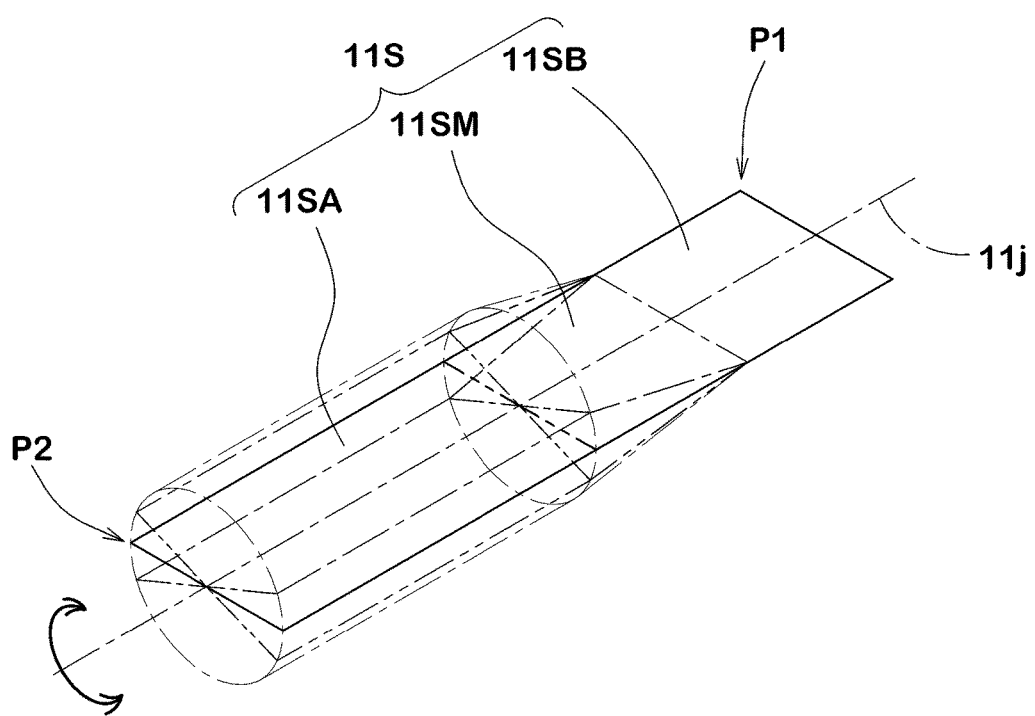
FIG. 5 is a conceptual diagram showing a transporting surface.
Figure 6:
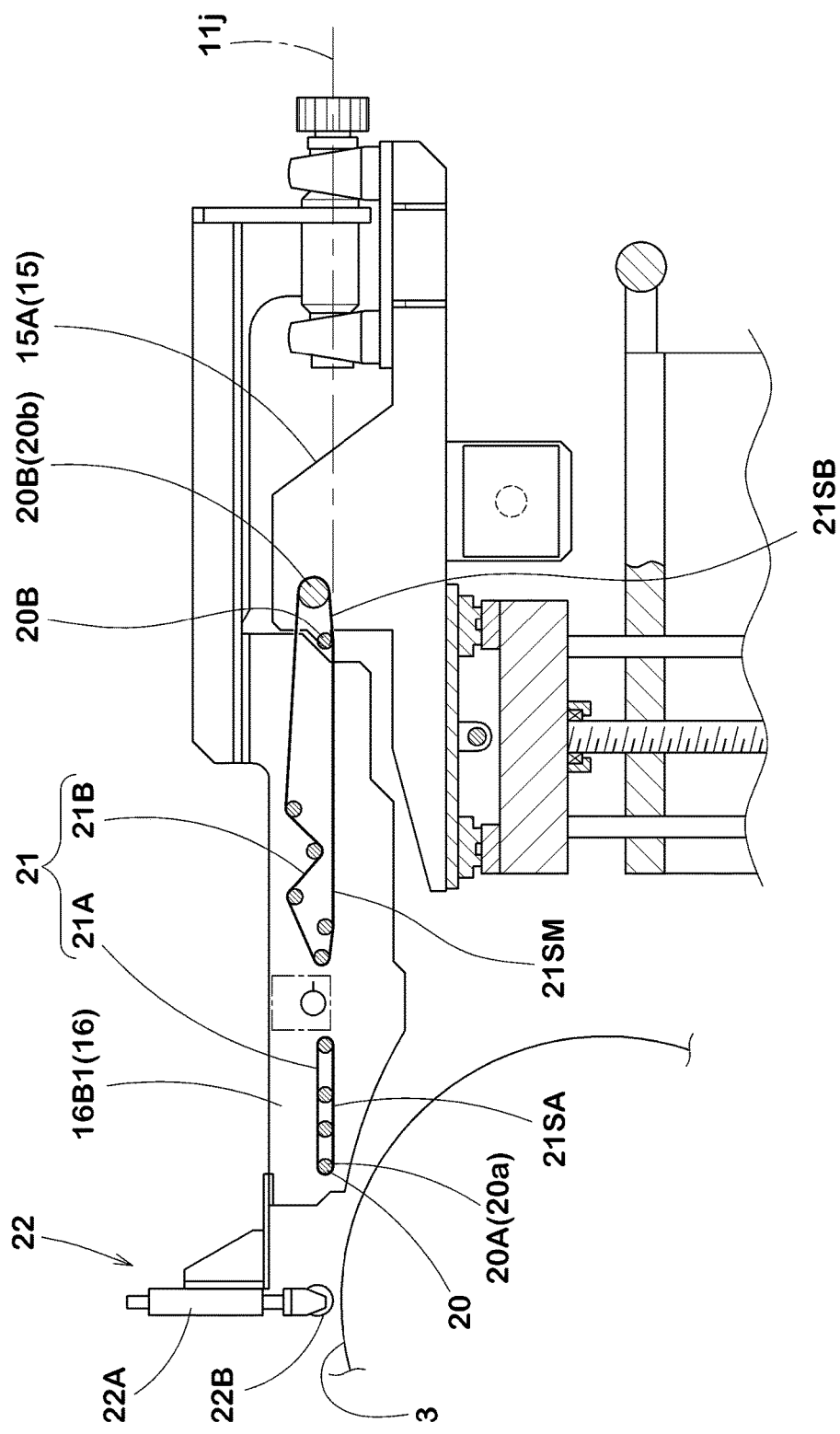
FIG. 6 is a side view of a pressing conveyor.

A plurality of guiding rollers 10 are distributed into forward-side guiding rollers 10A including a foremost-side guiding roller 10a disposed on the foremost side in the transporting direction, and backward-side guiding rollers 10B including a backmost-side guiding roller 10b disposed on the backmost side in the transporting direction. The forward-side guiding rollers 10A are held tiltably around the transporting surface width centerline 11j. Thus, the transporting surface 11S comprises, as shown in FIG. 5, a twistable twisting transporting surface portion 11SM around the transporting surface width centerline 11j between a forward-side transporting surface portion 11SA supported by the forward-side guiding rollers 10A and a backward-side transporting surface portion 11SB supported by the backward-side guiding rollers 10B.

In particular, the applicator 4 comprises a first frame 15 fixed to the lateral moving table 6 integrally movably, and a second frame 16 held tiltably by the first frame 15 around the transporting surface width centerline 11j.

The first frame 15 comprises a side-panel-like basal portion 15A rising at one edge of the lateral moving table 6. The basal portion 15A extends rearward over a back end of the lateral moving table 6, and the basal portion 15A is provided on the back end side with a mounting panel portion 15B for mounting the second frame flatly for example. And to the basal portion 15A, the backward-side guiding roller 10B is pivoted.

The second frame 16 comprises a support shaft 17 being concentric with the transporting surface width centerline 11j. The support shaft 17 is rotatably pivoted around the transporting surface width centerline 11j by the bearing holder 18 attached to the mounting panel portion 15B. The second frame 16 of the present embodiment comprises a rear panel portion 16A attached to the support shaft 17, and a front panel portion 16B extending toward the forward side replicated from an upper end of the rear panel portion 16A, for example. The front panel portion 16B is provided on the forward end side with a side-panel-like side panel portion 16B1 parallel to the basal portion 15A. To the side panel portion 16131, the forward-side guiding rollers 10A are pivoted.

The support shaft 17 is connected with an actuation motor (not shown) controllable in angle of rotation such as a step motor. And the backmost-side guiding roller 10b is connected with an actuation motor M2, thereby rotatably actuating the transporting belt 11.

The second frame 16 comprises a cutting means 19 for cutting the rubber strip T on the forward-side transporting surface portion 11SA. The cutting means 19 according to the present invention comprises a rotary shaft 19A rotatably actuated, and a cutter blade 19B extending radially outward from the periphery thereof. In the cutting means 19, the cutter blade 19B goes into a 360-degree roll at the same speed as the rubber strip T, thereby the rubber strip T can be cut while transporting. The cutter blade 19B is provided on its lower side with a guiding roller 10A1 having a comparatively large diameter, which supports the transporting belt 11 from underneath at the time of cutting.

The pressing conveyor 8, as shown in rig. 6, a plurality of upper guiding rollers 20 and a pressing belt 21 rotatably guided by the upper guiding rollers 20. The pressing belt 21 pushes the rubber strip T against the transporting belt 11, thereby preventing peeling, shifting, slipping and the like of the rubber strip T from the transporting belt 11. A pressing surface 21S of the pressing belt 21 comprises a frontward-side pressing surface portion 21SA pressing the rubber strip T against the forward-side transporting surface portion 11SA, a backward-side pressing surface portion 21SB pressing against the backward-side transporting surface portion 11SB, and a twisting pressing surface portion 21SM pushing against the twisting transporting surface portion 11SM.

In particular, the upper guiding rollers 20 are distributed into forward-side upper guide rollers 20A including a foremost-side upper guide roller 20a disposed on the foremost side in the transporting direction, and backward-side upper guide rollers 20B including a backmost-side upper guide roller 20b disposed on the backmost side in the transporting direction. And the backward-side upper guide rollers 20B are pivoted by the basal portion 15A of the first frame 15 as the same way as backward-side guiding rollers 10B. The forward-side upper guide rollers 20A are pivoted by the side panel portion 16B1 of the second frame 16 as the same way as the forward-side guiding rollers 10A.

The pressing belt 21 according to the present embodiment comprises a rear pressing belt 21B disposed on the backward side of the cutting means 19, and a front pressing belt 21A disposed on the frontward side of the cutting means 19.

The bonding device 1 according to the present embodiment is provided on the frontward side of the transporting conveyor 7 with a pressure bonding means 22. The pressure bonding means 22 bonds the rubber strip T applied on the wound body 3 by pressing against the wound body 3. The pressure bonding means 22 is provided at a rod lower end of the cylinder 22A with a pressure roller 22B pivoted via a holder. The cylinder 22A is supported by the side panel portion 16B1 of the second frame 16, and the pressure roller 22B is pivoted parallel to the forward-side guiding rollers 10A. Therefore, the pressure roller 22B is tiltible around the transporting surface width centerline 11j and can to bond the rubber strip T with an inclination in concert with the profile of the wound body.

Figure 7A:
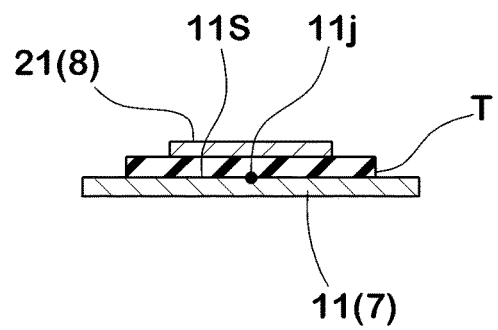
FIG. 7 (A) to (C) are explanatory views showing a gyration around a transporting surface width centerline of the transporting conveyor.
Figure 7B:
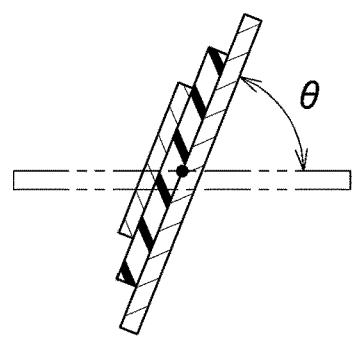
Figure 7C:
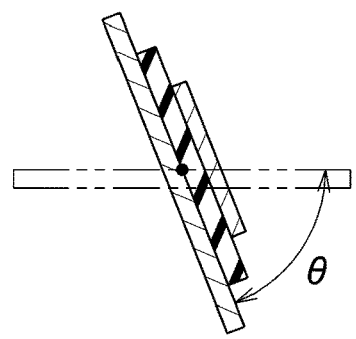

As shown in FIG. 7 (A), the transporting belt 11 of the transporting conveyor 7 has preferably a wider width than the rubber strip T, and the pressing belt 21 of the pressing conveyor 8 is preferably narrower than the rubber strip T. As shown in FIGS. 7 (B) and 7(C), an gyrating angle theta ($\theta$) gyratable around the transporting surface width centerline 11j while fastening the rubber strip T with the narrow pressing belt 21 without changing the lengths of the belts 11, 21 is about +/−80 degrees. Therefore, the gyrating angle theta ($\theta$) of the present embodiment is set to in a range of from −80 to +80 degrees.

Figure 8:
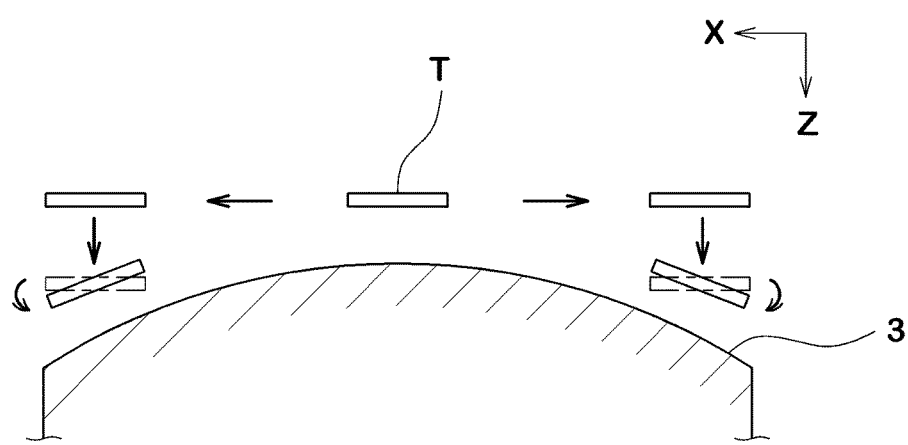
FIG. 8 is an explanatory diagram showing an operation of the bonding device.
Figure 9:
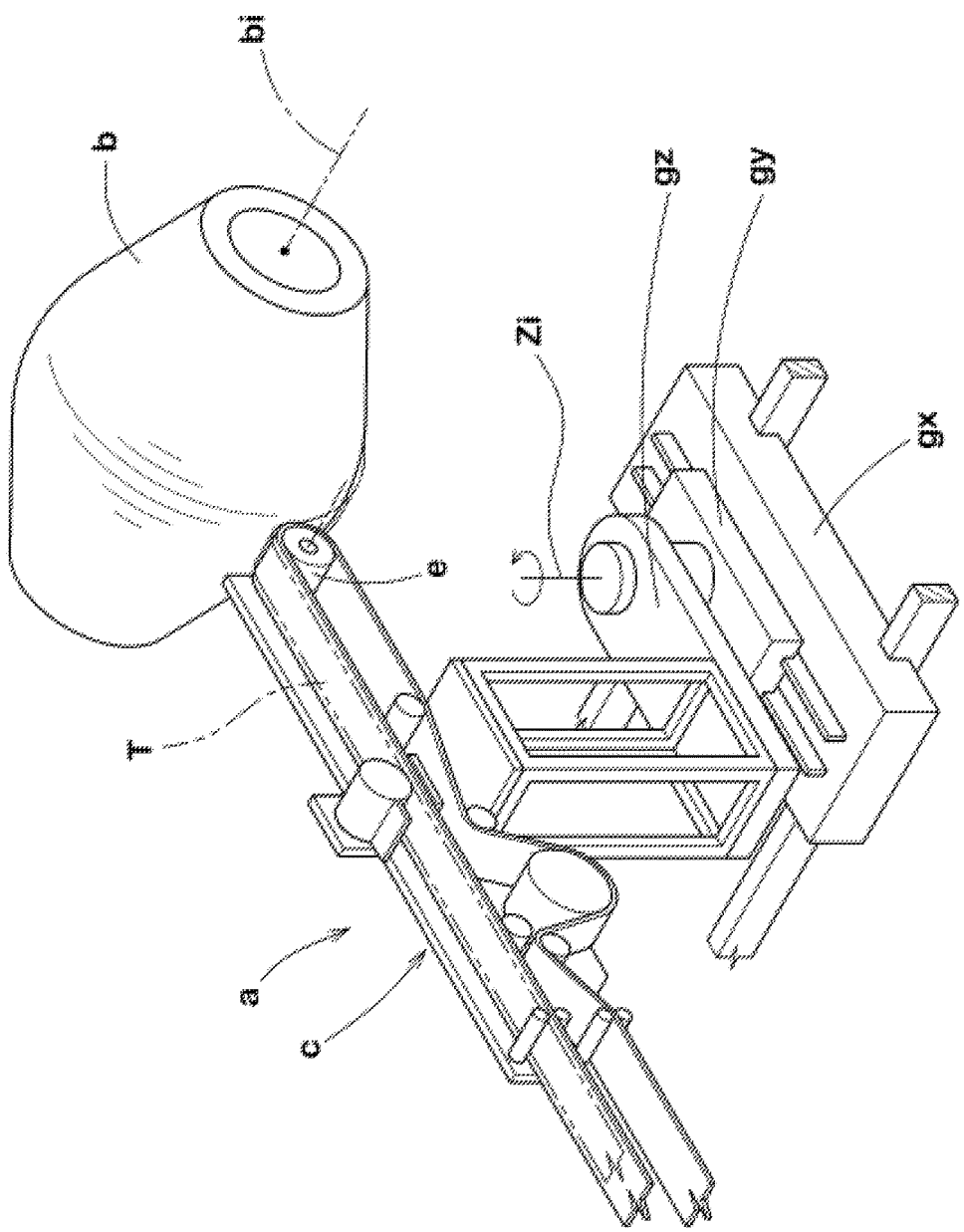
FIG. 9 is a perspective view showing a conventional device for bonding the rubber strip.

In the bonding device 1 according to the present embodiment, as described above, the lift table 9 and the lateral moving table 6 support the applicator 4 variably in the up-and-down direction (z-axis direction) and in the lateral direction (x-axis direction). Therefore, the rubber strip T can be accurately bonded in concert with the profile around the non-linear cylinder-like wound body 3 in cooperation with the gyrating motion around the transporting surface width centerline 11j as shown in FIG. 8, meanwhile, as substitute for the lift table 9 and the lateral moving table 6, the wound body 3 also can removably support in the up-and-down direction (z-axis direction) and in the lateral direction (x-axis direction) with respect to the applicator 4.

The above has described in detail a particularly preferred embodiment of the present invention, the invention is not limited to the embodiments shown, can be implemented by modifying to various aspects.

DESCRIPTION OF THE SIGN

1 Bonding device
3 Wound body
4 Applicator
7 Transporting conveyor
8 Pressing conveyor
10 Guiding roller
10a Foremost-side guiding roller
10A Forward-side guiding roller
10b Backmost-side guiding roller
10B Backward-side guiding roller
11 Transporting belt 11S Transporting surface
11j Transporting surface width centerline
11SA Forward-side transporting surface portion
11SB Backward-side transporting surface portion
11SM Twisting transporting surface portion
15 First frame
16 Second frame
20 Upper guiding roller
21 Pressing belt
21S Pressing surface
21SA Frontward-side pressing surface portion
21SB Backward-side pressing surface portion
21SM Twisting pressing surface portion
T Rubber strip

The invention claimed is:

1. A device for bonding an unvulcanized rubber strip, the device comprising:
    winding support body that has a nonlinear cylinder-like shape such that it has a changing diameter along its axis of rotation, and
    an applicator to transport the unvulcanized rubber strip to the winding support body and to bond the unvulcanized rubber strip around the winding support body,
    wherein the applicator comprises a transporting conveyor having a transporting belt which is guided by a plurality of guiding rollers and transports the unvulcanized rubber strip on a transporting surface;
    wherein the transporting surface is defined as a straight-line segment of the transporting conveyor that is in contact with the unvulcanized rubber strip at any given instant;
    wherein the guiding rollers are distributed into forward-side guiding rollers including a foremost-side guiding roller disposed on the foremost side in a direction of movement of the transporting surface and backward-side guiding rollers including a backmost-side guiding roller disposed on a backmost side in the direction of movement of the transporting surface, and the forward-side guiding rollers are held tiltably around the transporting surface width centerline, so that the transporting surface forms a twistable twisting transporting surface portion between a forward-side transporting surface portion supported by the forward-side guiding rollers and a backward-side transporting surface portion supported by the backward-side guiding rollers;
    wherein the applicator further comprises a pressing conveyor having a pressing belt which is guided by a plurality of upper guiding rollers and presses the unvulcanized rubber strip to the transporting belt;
    wherein the pressing belt comprises a pressing surface comprising:
        a frontward-side pressing surface portion to press the unvulcanized rubber strip against the forward-side transporting surface portion,
        a backward-side pressing surface portion to press the unvulcanized rubber strip against the backward-side transporting surface portion, and
        a twisting pressing surface portion to press the unvulcanized rubber strip against the twisting transporting surface portion; and
    wherein the applicator comprises a support shaft for changing a tilting angle of the forward-side transporting surface portion around the transporting surface width centerline while transporting the rubber strip.

2. The device according to claim 1, wherein:
    the backward-side guiding rollers are supported by a first frame, and the forward-side guiding rollers are supported by a second frame held tiltably by the first frame around the transporting surface width centerline.

3. The device according to claim 1, wherein:
    the support shaft is connected with an actuation motor controllable in angle of rotation.

4. The device according to claim 2, wherein:
    the second frame comprises a cutting means for cutting the unvulcanized rubber strip on the forward-side transporting surface portion.

5. A device for bonding an unvulcanized rubber strip, the device comprising
    a winding support body that has a nonlinear cylinder-like shape such that it has a changing diameter along its axis of rotation, and
    an applicator to transport the unvulcanized rubber strip to the winding support body and to bond the unvulcanized rubber strip around the winding support body,
    wherein the applicator comprises a transporting conveyor having a transporting belt which is guided by a plurality of guiding rollers and transports the unvulcanized rubber strip on a transporting surface;
    wherein the transporting surface is defined as a straight-line segment of the transporting conveyor that is in contact with the unvulcanized rubber strip at any given instant;
    wherein the guiding rollers are distributed into forward-side guiding rollers including a foremost-side guiding roller disposed on the foremost side in a direction of movement of the transporting surface and backward-side guiding rollers including a backmost-side guiding roller disposed on a backmost side in the direction of movement of the transporting surface, and the forward-side guiding rollers are held tiltably around the transporting surface width centerline, so that the transporting surface forms a twistable twisting transporting surface portion between a forward-side transporting surface portion supported by the forward-side guiding rollers and a backward-side transporting surface portion supported by the backward-side guiding rollers; and
    wherein the applicator comprises a support shaft for changing a tilting angle of the forward-side transporting surface portion around the transporting surface width centerline while transporting the rubber strip.

6. The device according to claim 5, wherein:
    the support shaft is connected with an actuation motor controllable in angle of rotation.

* * * * *